(12) United States Patent
Cherel et al.

(10) Patent No.: US 10,274,397 B2
(45) Date of Patent: Apr. 30, 2019

(54) DEVICE FOR INSPECTING BY INTERFEROMETRY

(71) Applicant: DATA-PIXEL, Chavanod (FR)

(72) Inventors: Loïc Cherel, Annecy (FR); Frédéric Gandebeuf, Rumilly (FR); Julien Maille, Annecy (FR)

(73) Assignee: DATA-PIXEL, Chavanod (FR)

( * ) Notice: Subject to any disclaimer, the term of this patent is extended or adjusted under 35 U.S.C. 154(b) by 8 days.

(21) Appl. No.: 15/577,781

(22) PCT Filed: Jun. 16, 2016

(86) PCT No.: PCT/IB2016/053560
§ 371 (c)(1),
(2) Date: Nov. 29, 2017

(87) PCT Pub. No.: WO2016/203412
PCT Pub. Date: Dec. 22, 2016

(65) Prior Publication Data
US 2018/0180513 A1    Jun. 28, 2018

(30) Foreign Application Priority Data
Jun. 19, 2015   (FR) ..................................... 15 55627

(51) Int. Cl.
*G02B 6/38* (2006.01)
*G01B 11/24* (2006.01)
*G01M 11/08* (2006.01)

(52) U.S. Cl.
CPC ....... *G01M 11/088* (2013.01); *G01B 11/2441* (2013.01); *G02B 6/385* (2013.01); *G02B 6/3885* (2013.01); *G02B 6/3893* (2013.01)

(58) Field of Classification Search
CPC ............ G01M 11/088; G01B 11/2441; G02B 6/3885; G02B 6/3893
See application file for complete search history.

(56) References Cited

U.S. PATENT DOCUMENTS

| 6,215,555 B1 * | 4/2001 | Chivers ................ G02B 6/3833 356/511 |
| 6,416,236 B1 * | 7/2002 | Childers .............. G02B 6/3835 385/84 |
| 6,705,767 B1 * | 3/2004 | Dean, Jr. .................. G01B 9/02 356/477 |
| 7,004,639 B2 * | 2/2006 | Norland ............... G02B 6/3807 356/73.1 |

(Continued)

FOREIGN PATENT DOCUMENTS

EP        1083448 B1      3/2001

*Primary Examiner* — Shawn Decenzo
(74) *Attorney, Agent, or Firm* — William H. Eilberg

(57) ABSTRACT

Device for inspecting by interferometry the geometry of an end face of a ferrule of a multi-fiber optic connector. The device allows the ferrule to be held by a holder of the ferrule, and a supporting plate including a receiving device adopts a position in space that is mainly conditioned by the interaction of the receiving device of the supporting plate with an engagement device provided on the ferrule. The supporting plate includes a reference surface with respect to which is measured by interferometry the geometry of the end face of the ferrule, the position of this reference surface being preset with respect to the orientations of the receiving device.

19 Claims, 16 Drawing Sheets

(56) References Cited

U.S. PATENT DOCUMENTS

| | | | |
|---|---|---|---|
| 9,915,525 B2* | 3/2018 | Towfiq | G01B 11/26 |
| 9,964,709 B2* | 5/2018 | Towfiq | G02B 6/385 |
| 9,983,364 B2* | 5/2018 | Towfiq | G02B 6/385 |
| 2003/0227634 A1* | 12/2003 | Kobayashi | G02B 6/3807 |
| | | | 356/508 |
| 2004/0013394 A1* | 1/2004 | Norland | G02B 6/3807 |
| | | | 385/137 |
| 2005/0036742 A1* | 2/2005 | Dean, Jr. | G02B 6/3865 |
| | | | 385/71 |
| 2012/0027358 A1* | 2/2012 | Webb | G01B 11/02 |
| | | | 385/78 |

\* cited by examiner

DEVICE FOR INSPECTING BY INTERFEROMETRY

TECHNICAL FIELD OF THE INVENTION

The present invention relates to the inspection of the geometry of an optical multifiber connector, and more particularly relates to the inspection of an end face of a ferrule of an optical multifiber connector.

Optical fibers allow data to be transmitted over large distances using light signals. In order to increase the quantity of data transmitted, it is common practice to make use of a plurality of optical fibers positioned next to one another forming a ribbon-shaped optical conductor. The optical conductor may be connected to another optical conductor by means of a connector. The connector typically comprises, at each end of the optical conductors to be connected, an end piece that is generally produced by molding around the optical fibers and is referred to as a ferrule. The optical fibers of an optical conductor end by opening onto an end face of the ferrule, which end face is intended to be positioned against the end face of another ferrule with the optical fibers of the different ferrules being placed so as to correspond with one another. Good physical contact of the optical fibers (set end to end) of two successive optical conductors allows light signals to pass correctly from the optical fibers of one optical conductor to the optical fibers of the other optical conductor.

An example of a multifiber ferrule is described in particular in document EP 1 083 448 B1.

As taught in documents U.S. Pat. Nos. 7,004,639 B2 and 6,215,555 B1, in order to ensure good transmission from one optical fiber to another, the positioning of one end face against the other end face of the two ferrules requires a high degree of accuracy. In order to achieve this, the ferrules are generally provided with two guide holes that make it possible, with the aid of guide rods that are inserted into the guide holes of the two ferrules, to position the optical fibers so that they correspond with one another with a high degree of accuracy.

The end faces of the ferrules are polished in order to endow them with a geometry that is as close as possible to established standards (in particular set by guidelines). This polishing is intended in particular to provide the end faces with a high degree of planarity, as well as mean angles with respect to the mean direction or the guide holes which fall within a rather strict tolerance range that is intended to promote good physical contact between optical fibers and hence good transmission.

In order to compensate for deviations in the geometry of ferrules (angles of the end faces in particular) that are intended to be connected to one another, the connectors comprise elastic return means that allow the ferrules to be pressed against one another (to bear against one another via their end faces) with a predetermined force. The value of said predetermined force is defined by standards.

Very strict geometry criteria have thus been established for the end face of the ferrules, in order to ensure that the geometry of this end face will allow good data transmission when connected to another ferrule with said predetermined force. In particular, the standard 61755-3-31 by the International Electrotechnical Commission (IEC) stipulates that various geometrical parameters of the end face of the ferrule (in particular an angular value "$S_X$" that can be taken as the mean angle, in the plane comprising the directions of elongation of the guide holes, of the end face portion comprised between the two guide holes of the ferrule with respect to the mean of the directions of elongation of the guide holes) are to be measured. Using these parameters, a force "GL" is then calculated using a pre-established formula. The force GL is the pressing force to which the ferrule will have to be subjected in order to guarantee physical contact between optical fibers allowing data to be transmitted satisfactorily, considering its geometrical parameters. If the calculated force GL is higher than a predetermined value, this means that the geometry of the ferrule is unsatisfactory and the optical conductor is then rejected.

Document U.S. Pat. No. 7,004,639 B2, which is considered to be the closest prior art, describes a device and a method for inspecting, by interferometry, the geometry of an end face of a ferrule. In this document, the ferrule F is attached to the interferometer I by push-fitting the ferrule F onto two rods T1 and T2 penetrating the guide holes TG1 and TG2 of the ferrule F (see FIG. 1 below). The rods T1 and T2 are borne by a fixed support flange FS of the interferometer I. Once the ferrule F has been immobilized with respect to the interferometer I, a plurality of measurement points are taken on the end face FE of the ferrule F in order to mathematically reproduce the shape and to determine the geometrical parameters thereof. In order to carry out the measurements, a planar surface that is perpendicular to the directions of elongation of the rods T1 or T2 is used as a reference, as taught in documents U.S. Pat. Nos. 6,705,767 B1 and 6,215,555 B1, for example.

When the measurement is carried out using the device of document U.S. Pat. No. 7,004,639 B2, there is however the drawback that the optical fibers protruding beyond the ferrule (on the side opposite the end face being inspected) form a conductor C that is relatively stiff and/or heavy. This stiffness and/or this weight of the conductor C leads to lateral stresses on the ferrule F which interfere with a satisfactory positioning of the ferrule F with respect to the interferometer I and/or with respect to the rods T1 and T2 (for example by slightly deforming the ferrule F and/or the rods T1 and T2). This leads to the measurement carried out being skewed. In the context of FIG. 2 below, the ferrule F is subject to a slight tilt which artificially increases the angle $S_X$ by an angle ε, such that the ferrule F being inspected risks being rejected even though its geometrical parameters are in fact satisfactory. This may conversely artificially decrease the angle $S_X$, such that the ferrule F being inspected might be considered to be adequate even though its geometrical parameters are in fact unsatisfactory.

Document US 2003/227634 A1 contains a technical teaching that is close to that of document U.S. Pat. No. 7,004,639 B2. However, in document US 2003/227634 A1, instead of the ferrule being held by means of rods engaged in guide holes of the ferrule, the ferrule is held between opposing jaws that bear on the outer surface of the ferrule, which is a cylinder with a circular cross section. In this instance too, it has the drawback that the optical fiber protruding beyond the ferrule (on the side opposite the end face being inspected) forms a conductor that is relatively stiff and/or heavy. This stiffness and/or this weight of the conductor leads to lateral stresses on the ferrule which interfere with a satisfactory positioning of the ferrule with respect to the interferometer and/or with respect to the jaws between which the ferrule is held (for example by slightly deforming the ferrule and/or the jaws, or by causing the ferrule to twist between the jaws). This leads to the measurement carried out being skewed.

SUMMARY OF THE INVENTION

The problem proposed by the present invention is to limit the risk of errors caused by the rigidity and/or the weight of an optical conductor when the geometry of a ferrule is being inspected by interferometry.

In order to meet this, and other, objectives, the invention proposes an inspection device for inspecting, by interferometry, the geometry of an end face of a ferrule of an optical multifiber connector, said ferrule including engaging means, comprising:
- a support flange including first and second surfaces that are substantially opposite one another and receiving means that are positioned and oriented in a predetermined manner with respect to the at least one reference surface borne by the support flange, said receiving means being suitable for cooperating with the engaging means of the ferrule in order to position and to orient the ferrule with respect to the support flange by receiving the ferrule in an axial receiving direction and by rotationally indexing the ferrule about said axial receiving direction;
- means for holding the support flange, suitable for receiving the support flange in a rest position in which the support flange is fixed with respect to the interferometry inspection device, according to the invention:
- the means for holding the support flange are suitable for releasing the support flange into at least one release position in which the support flange is able to move with respect to the interferometry inspection device;
- the interferometry inspection device includes means for holding the ferrule, which means are separate from the receiving means and are selectively movable between a gripping position, in which the means for holding the ferrule hold the ferrule fixed with respect to the interferometry inspection device, and a relaxed position, in which the means for holding the ferrule allow the ferrule to move with respect to the interferometry inspection device.

During an inspection, the device according to the invention allows the ferrule to be held with respect to the interferometry inspection device by means of means for holding the ferrule while said ferrule is engaged in the receiving means of the support flange. During this inspection, because the means for holding the ferrule are separate from the receiving means, the support flange may be placed in a release position allowing it to assume a position, with respect to the interferometer, that is dictated only by the cooperation of the receiving means of the support flange and of the engaging means of the ferrule (and the action of gravity on the support flange, the weight of which may be sufficiently low to limit the risk of causing an error). Stated otherwise, since it is not fixed with respect to the interferometry inspection device, the support flange (as well as its reference surface) may more freely follow the lateral movements caused by the ferrule due to the rigidity and/or the weight of the optical conductor. If lateral stresses are caused in the ferrule by the rigidity and/or the weight of the optical conductor, these will mostly be absorbed by the means for holding the ferrule (which are in the gripping position while the support flange is placed in the release position) and will have less effect on the relative positioning of the support flange (with its receiving means) and of the ferrule which is used, to determine the geometry of the end face of the ferrule.

Since the receiving means (such as rods for example) have orientations that are predetermined with respect to the reference surface borne by the support flange, the measurement of the end face made with respect to the reference surface makes it possible to provide a more accurate determination of the geometrical parameters (angles $S_x$ and $S_y$ in particular) of the end face of the ferrule with respect to the engaging means of the ferrule (such as guide holes for example).

Any well-polished surface of the support flange that is planar (or non-planar having a predetermined shape) may be used as a reference surface. However, the support flange may advantageously include:
- a light passing through the support flange from its first surface to its second surface;
- at least one planar reference surface that is added and attached to the first surface of the support flange, and positioned so as to correspond with an area of the light.

The reference surface borne by the support flange is thus located in immediate proximity to the plane in which the end face of the ferrule should substantially be located, thereby making it possible to simultaneously measure the two surfaces without having to separately refocus the interferometry inspection device on the end face and on the reference surface. The measurements are thus made more quickly.

Preferably, said at least one planar reference surface may be borne by a glass plate that is added and attached to the first surface of the support flange.

A glass plate includes faces that generally exhibit good planarity and it is an inexpensive material. In addition, the natural reflectiveness of glass is similar to that of the materials in which ferrules (and their end face) are generally made, such as PES (polyphenylene sulfide) in particular, thereby facilitating interferometry measurements. Alternatively, it would be possible to use a silicon plate that is added and attached to the first surface of the support flange in order to form a reference surface.

Advantageously, it is possible to make provision for:
- the interferometry inspection device to include a first planar reference surface and a second planar reference surface;
- the first planar reference surface to form an angle of about 90° with the axial receiving direction;
- the second planar reference surface to form an angle of about 98° with the axial receiving direction.

The first reference surface makes it possible to inspect a ferrule of PC type (in physical contact and not angled), the end face of which is supposed to be positioned in a plane that is substantially perpendicular to the axial receiving direction.

The second reference surface makes it possible to inspect a ferrule of APC type (in physical contact and angled), the end face of which is supposed to be positioned in a plane forming an angle of about 8° with the plane containing the direction of elongation of the engaging means of the ferrule (such as guide holes for example).

The support flange thus includes reference surfaces that make it possible to inspect both PC (physical contact) or APC (angled physical contact) ferrules.

Preferably, it is possible to make provision for:
- the interferometry inspection device to include, on the first surface of the support flange, a dihedron protruding away from, the second surface of the support flange;
- the generatrix at the apex of the dihedron to be contained, in at least one plane that is defined by said at least one reference surface.

Once the ferrule has been pushed onto the rods, the ferrule is thus stopped by coming into contact with the apex of the dihedron, the end face extending on either side of the generatrix of the apex of the dihedron. This is a stop position that is relatively easy to obtain repeatedly by pressing in the middle of the end face, and facilitates the measurement of the geometry of the end face.

Advantageously, it is possible to make provision for:
the interferometry inspection device to include, on the first surface of the support flange, a dihedron protruding away from the second surface of the support flange;
the sides of the dihedron to have, with respect to the axial receiving direction, angles that are smaller than or equal to 81°.

The angles of the dihedron make it possible to prevent the ferrule being stopped, while it is being pushed onto the rods, by contact between an outer edge of the end face and the support flange (against one of the faces of the dihedron), even when the ferrule is of APC type.

Preferably, it is possible to make provision for:
the means for holding the support flange to include a frustoconical bearing seat;
the support flange to include a frustoconical peripheral surface that is suitable for cooperating, by conical engagement, with the frustoconical bearing seat of the means for holding the support flange.

Conically push-fitting the support flange into the means for holding the flange makes it possible to simply and accurately immobilize the support flange with respect to the interferometry inspection device. This immobilization is however easily reversible by means of pressure exerted on the support flange away from the frustoconical bearing seat.

Advantageously, in the rest position, the means for holding the support flange hold the support flange in a predetermined orientation with respect to the inspection device about the axial receiving direction.

Such an orientation makes it possible for an operator to quickly and easily engage ferrules to be inspected on the receiving means, since the support flange is always in one and the same orientation when the support flange is in the rest position.

In practice, it is advantageously possible to make provision for:
the frustoconical bearing seat to include a non-circular cross section;
the frustoconical peripheral surface of the support flange to include a non-circular cross section that is complementary to the cross section of the frustoconical bearing seat.

Preferably, provision may be made for:
the means for holding the ferrule to include a first jaw and a second jaw that are able to move with respect to one another between a gripping position and a relaxed position;
in the gripping position, the jaws to clasp the ferrule between them in order to hold it fixed with respect to the interferometry inspection device;
in the relaxed position, the jaws to be at a distance from one another so as to allow the ferrule to move with respect to the interferometry inspection device.

The jaws may each be able to move with respect to the interferometry inspection device. Alternatively, one of the jaws may be fixed with respect to the interferometry inspection device while the other is movable.

In order to hold a ferrule, the outer shape of which is substantially parallelepipedal (MT-type ferrule for example), two bracket-shaped jaws may be used.

Advantageously, provision may be made for:
the means for holding the support flange to include elastic return means for returning the support flange to its rest position;
the inspection device to include inhibition means for selectively stopping the elastic return force exerted by the elastic return means.

The elastic return means contribute to keeping the support flange in a rest position in order to allow an operator to accurately and efficiently push-fit a ferrule onto the rods.

The inhibition means make it possible to stop any effect of the elastic return means on the support flange. The support flange may thus, in the released position, assume a position in space chat is primarily dictated by the push-fitting of the rods into the guide holes in the ferrule. This position is only slightly dependent on the action of gravity under the effect of the support flange's own weight, this action potentially being rendered negligible by using a flange of lighter weight.

Preferably, when a user engages a ferrule in the receiving means of the support flange by applying pressure to the support flange beyond a predetermined value, the support flange may move, in opposition to the means for holding the support flange, to a release position.

Thus, just by continuing the pushing action, following the engagement of the ferrule in the receiving means via its engaging means, the operator contributes to automatically placing the support flange in the released position. The inspection device is thus simple and intuitive for the operator to handle.

Advantageously, the means for holding the ferrule grip the ferrule only when the support flange is not in the rest position. It is thus ensured that, when the ferrule is immobilized with respect to the inspection device, the position of the support flange with respect to the ferrule is not restricted by anything other than the push-fitting of the rods into the guide holes in the ferrule (and by the action of gravity, but to a very small degree).

Advantageously, provision may be made for:
the receiving means to include at least two rods extending in the same direction from the first surface of the support flange and away from the first surface of the support flange;
the rods to extend, respectively, in first and second directions of elongation that are substantially parallel to predetermined orientations with respect to said at least one reference surface borne by the support flange;
the rods to be dimensioned and positioned so as to be able to penetrate, respectively, the engaging means comprising guide holes, in order to position and to orient the ferrule with respect to the support flange.

The two rods receive and orient the ferrule in a reliable manner by push-fitting into the guide holes. The guide holes thus serve as a reference for positioning and orienting the ferrule with respect to the support flange.

According to another aspect, the present invention proposes a method for inspecting, by interferometry, the geometry of an end face of a ferrule of an optical multifiber connector. According to the invention, said method includes the following steps:
A) providing an interferometer;
B) providing a support flange including first and second surfaces that are substantially opposite one another and receiving means that are positioned and oriented in a predetermined manner with respect to the at least one reference surface borne by the support flange, said receiving means being suitable for cooperating with the engaging means of the ferrule in order to position and to orient the ferrule with respect to the support flange by receiving the ferrule in an axial receiving direction and by rotationally indexing the ferrule about said axial receiving direction;

C) providing a ferrule including engaging means that are suitable for cooperating with the receiving means, and including an end face, the geometry of which must be inspected;

D) engaging the ferrule in the receiving means of the support flange;

E) gripping the ferrule by means of the holding means in order to hold the sub-assembly formed by the ferrule and the support flange in a fixed position with respect to the interferometer, the support flange being held, with respect to the interferometer, only via the ferrule which is held in the holding means;

F) inspecting the geometry of the end face of the ferrule by focusing the interferometer on a reference surface of the support flange and by focusing the interferometer on the end face of the ferrule.

Step F) of inspecting the geometry of the end face is carried out while the support flange (and hence the reference surface) is primarily positioned with respect to the ferrule by the push-fitting of the rods into the guide holes in the ferrule, the action of gravity under the effect of the support flange's own weight being negligible by virtue of using a flange of lighter weight. Since the support flange is held, with respect to the interferometer, only via the ferrule, which is itself held in the holding means, the effect of lateral stresses caused by the rigidity and/or the weight of the optical conductor is mitigated, or even cancelled out completely, by virtue of the fact that an angular movement of the ferrule with respect to the interferometer is also transmitted to the support flange.

Advantageously, in step F), the interferometer may simultaneously be focused on the end face of the ferrule and on a reference surface.

According to yet another aspect, the present invention proposes the use of the interferometry inspection device described above for implementing the method described above. Said use includes the following steps:

a) providing an interferometry inspection device such as described above;

b) providing a ferrule including engaging means that are suitable for cooperating with the receiving means, and including an end face, the geometry of which must be inspected;

c) placing the support flange in the rest position;

d) engaging the ferrule in the receiving means of the support flange;

e) placing the support flange in the release position;

f) moving the means for holding the ferrule into the gripping position;

g) inspecting the geometry of the end face of the ferrule by focusing the interferometer on a reference surface of the support flange and by focusing the interferometer on the end face of the ferrule.

Step g) of inspecting the geometry of the end face is carried out while the support flange (and hence the reference surface) is primarily positioned with respect to the ferrule by the push-fitting of the rods into the guide holes in the ferrule, the action of gravity under the effect of the support flange's own weight being negligible by virtue of using a flange of lighter weight. The lateral stresses caused by the rigidity and/or the weight of the optical conductor are mitigated, or even cancelled out completely, by virtue of the fact that an angular movement of the ferrule with respect to the interferometry inspection device is also transmitted to the support flange.

In order to facilitate the use of the inspection device by an operator and to promote a high degree of repeatability in the measurements carried out, it is advantageously possible to make provision for:

the interferometry inspection device to include elastic return means for returning the support flange to its rest position;

the interferometry inspection device to include inhibition means for selectively stopping the elastic return force exerted by the elastic return means;

in step d), the user to apply a force that causes the support flange to move to a release position in opposition to the elastic return means;

after step f), the inhibition means to stop the return of the support flange to its rest position exerted by the elastic return means.

In order to decrease the time required for the measurements, it is preferably possible to make provision for, in step g), the interferometer to simultaneously focus on the end face of the ferrule and on a reference surface.

BRIEF DESCRIPTION OF THE DRAWINGS

Other objectives, features and advantages of the present invention will become apparent from the following description of particular embodiments provided with reference to the appended figures, in which.

DESCRIPTION OF PREFERRED EMBODIMENTS

FIGS. 3 to 20 illustrate one particular embodiment of the interferometry inspection device 1 according to the invention. The inspection device 1 is used to inspect the geometry of an end face 2 of a ferrule 3 of an optical multifiber connector. This ferrule 3, which is substantially parallelepipedal in shape, is referred to as an "MT ferrule". In the figures, the ferrule 3 has been shown without optical, fibers so as not to overly complicate the representation.

Figure 5:
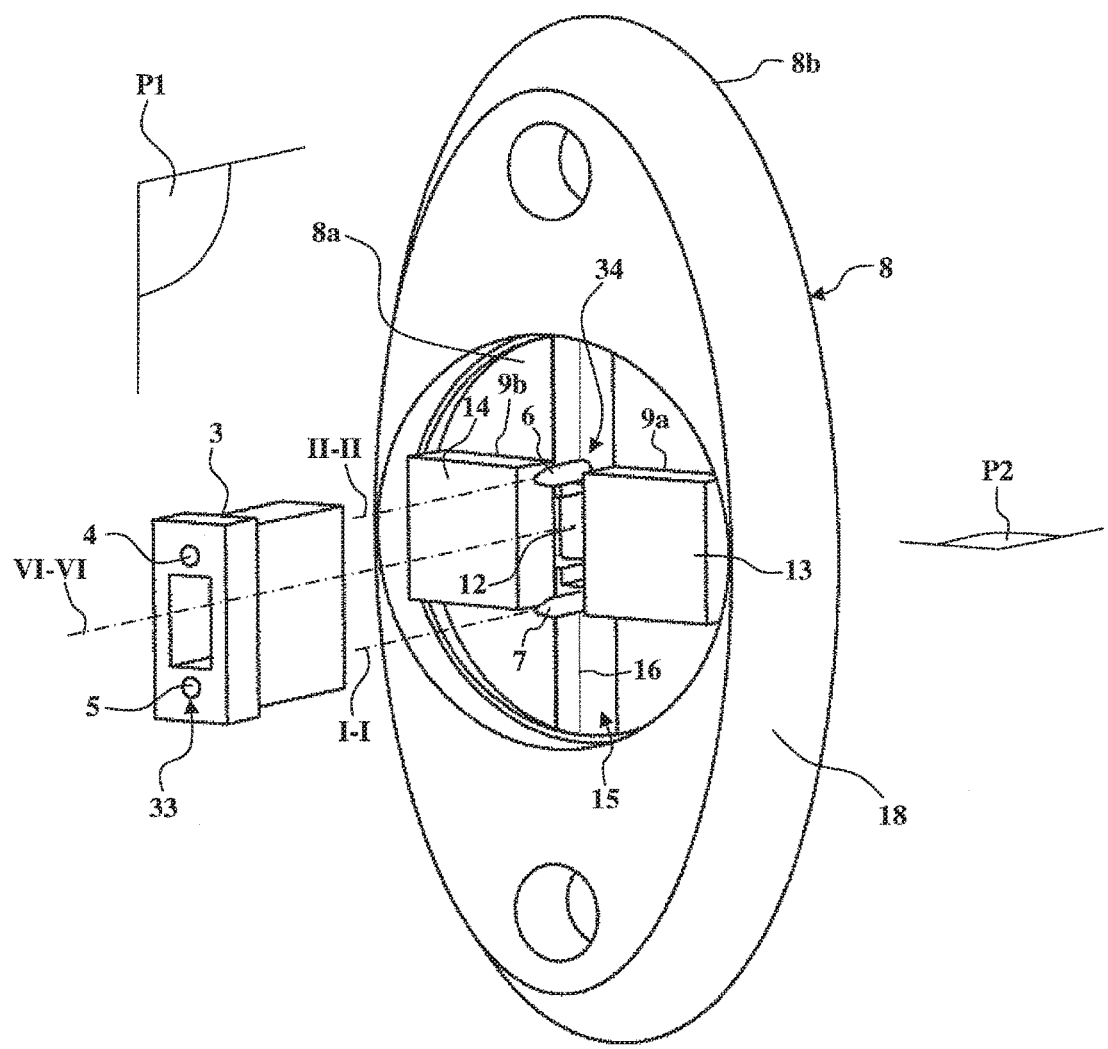
FIG. 5 is a perspective view of a support flange used in the interferometry inspection device of FIG. 2.
Figure 6:
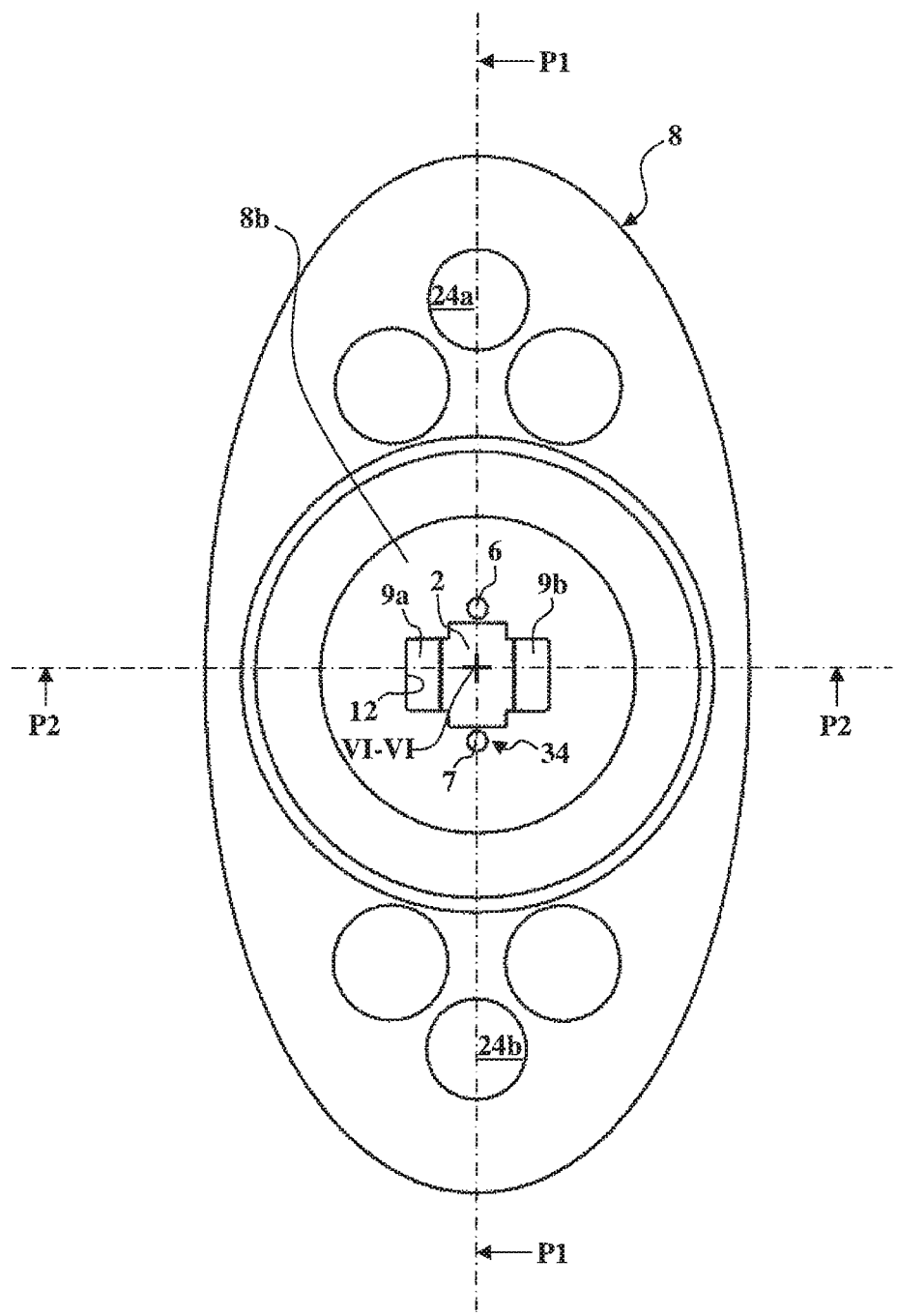
FIG. 6 is a rear view of the support flange of FIG. 5.
Figure 7:
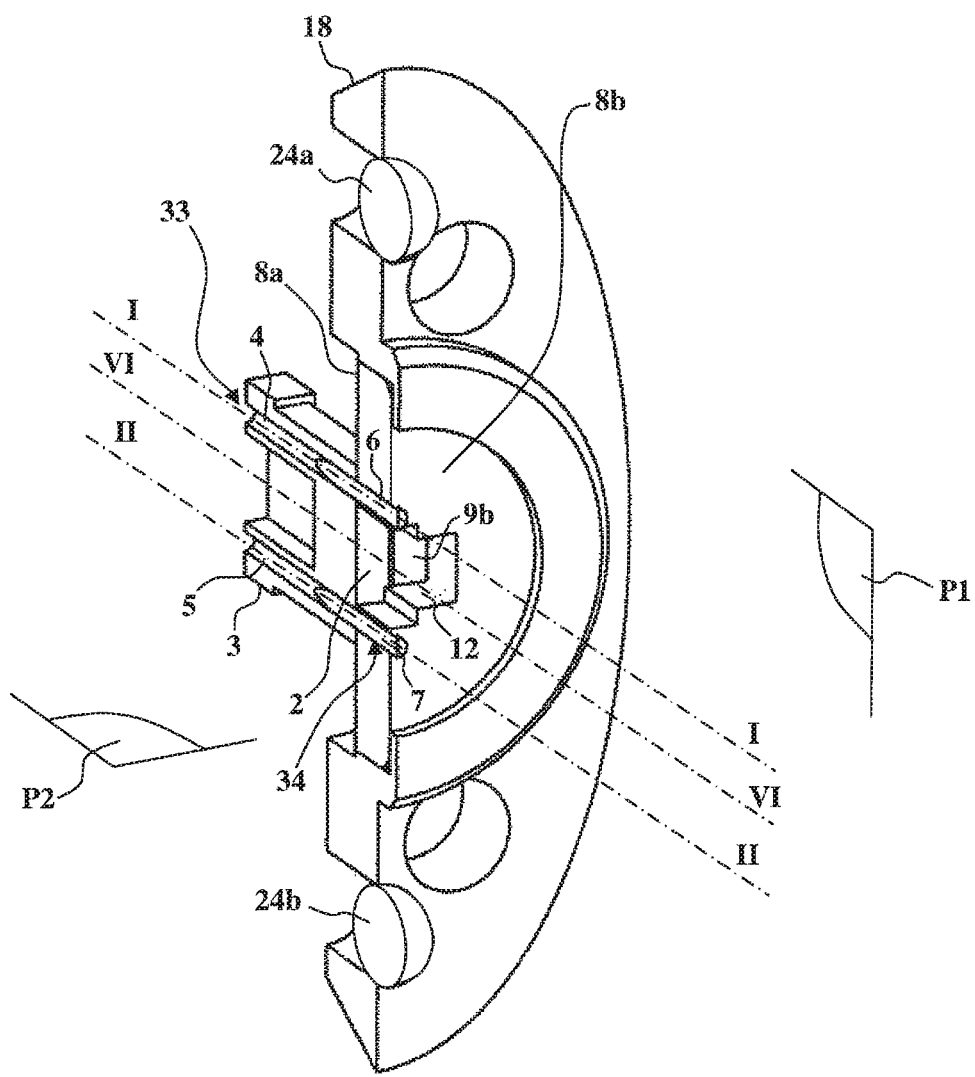
FIG. 7 is a perspective view of a cross section, through a first plane P1, of the flange of FIG. 5 with a ferrule push-fitted onto two rods borne by the support flange.

FIGS. 5 and 7 more particularly show that the ferrule 3 includes engaging means 33 comprising two guide holes 4 and 5 that are suitable for cooperating with the receiving means 34 comprising rods 6 and 7. The rods 6 and 7 may be received by means of push-fitting into the guide holes 4 and 5 in an axial receiving direction VI-VI. The receiving means 34 thus cooperate with the engaging means 33 in order to receive the ferrule 3 in the axial receiving direction VI-VI and to rotationally index the ferrule 3 about said axial receiving direction VI-VI.

The rods 6 and 7 of the receiving means 34 are borne by a support flange 8 (FIGS. 5 to 11) including a first surface 8a and a second surface 8b that are substantially opposite one another. The two rods 6 and 7 extend in one and the same direction from the first surface 8a of the support flange 8 and away from the first surface 8a. More particularly, the rods 6 and 7 extend in first and second directions of elongation I-I and II-II, respectively, which directions are substantially parallel (and parallel to the axial receiving direction VI-VI), the orientations of which are predetermined with respect to reference surfaces 9a and 9b borne by the support flange 8. The rods 6 and 7 are sized and positioned so as to be able to penetrate, respectively, the guide holes 4 and 5 of the ferrule 3 in order to immobilize and orient the ferrule with respect to the support flange 8.

Figure 12:
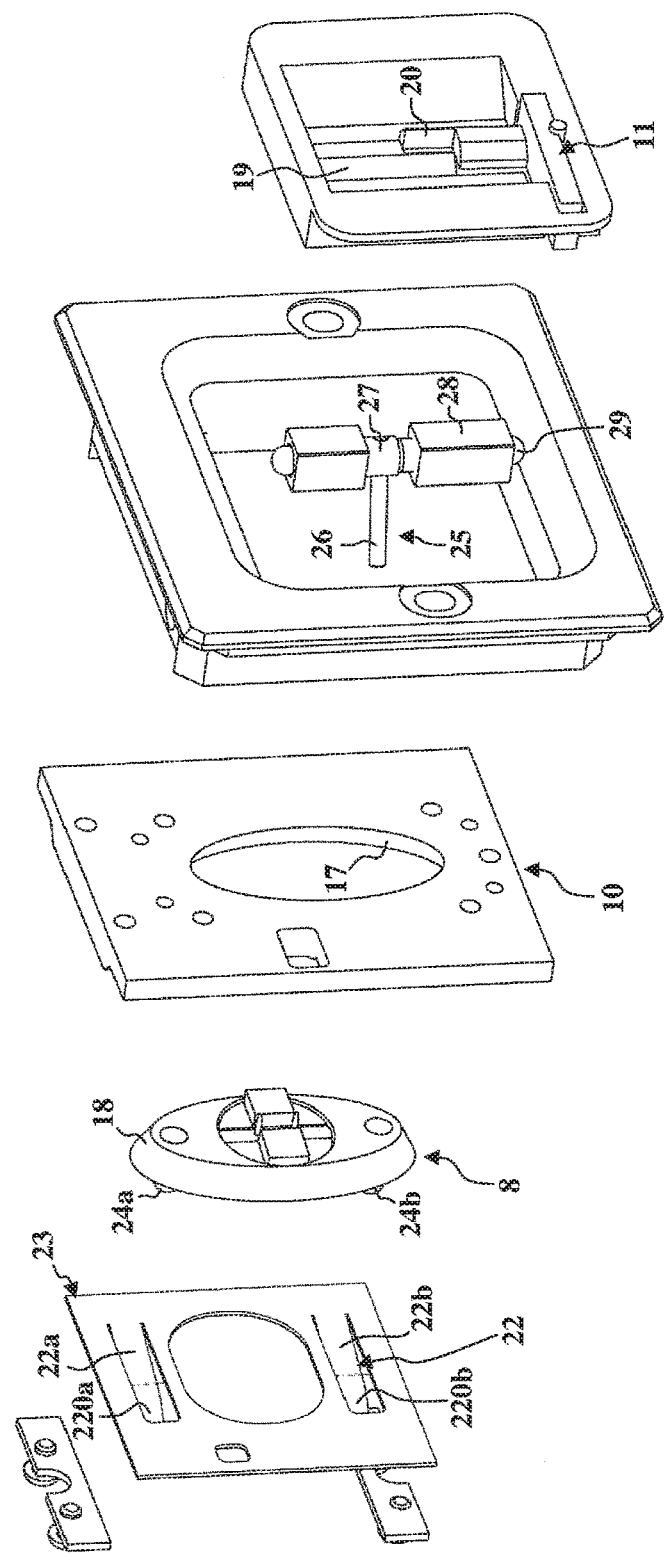
FIG. 12 is an exploded perspective view of certain constituent elements of the interferometry inspection device of FIG. 3.
Figure 13:
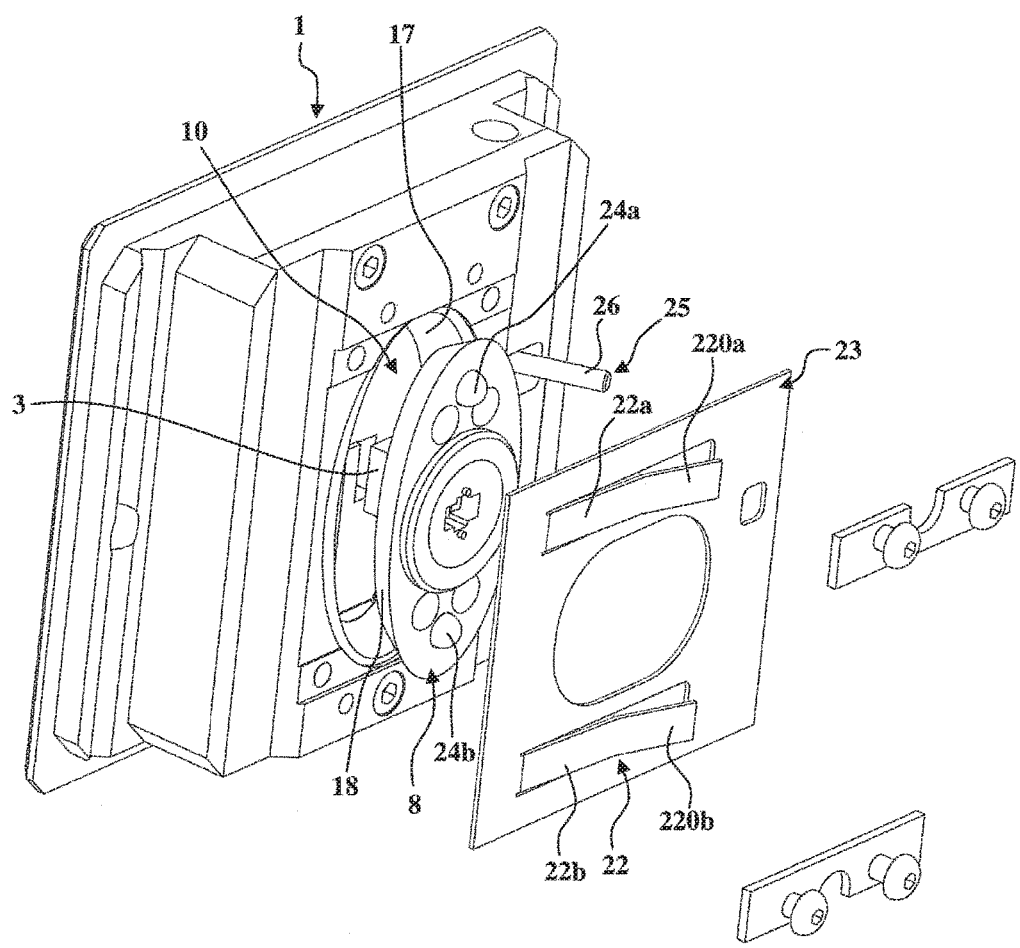
FIG. 13 is a perspective view that is similar to that of FIG. 12, in which certain elements are shown assembled and others are shown exploded.

As illustrated more particularly in FIGS. 12 and 13, the inspection device 1 includes means 10 for holding the support flange 8 that are suitable for receiving the support flange 6 in a rest position (FIG. 16), in which the support flange 8 is fixed with respect to the interferometry inspection device 1.

Figure 17:
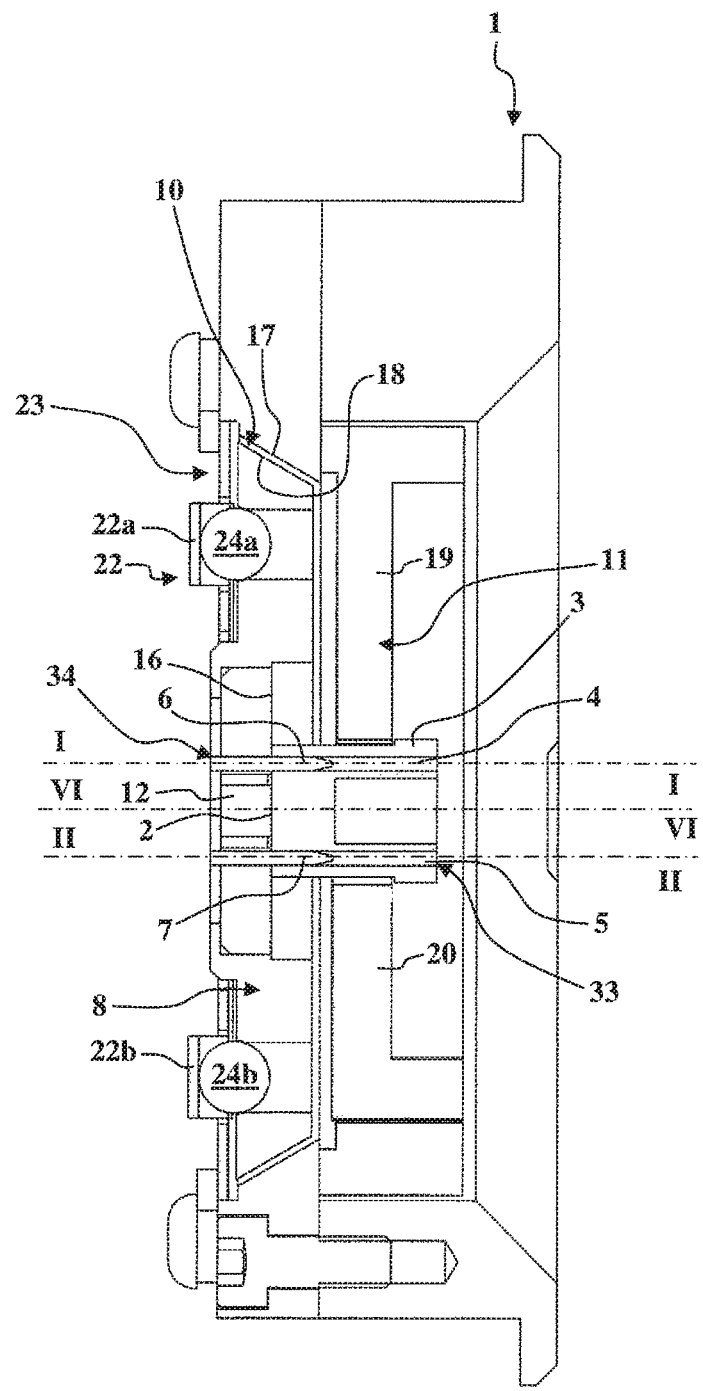
FIG. 17 is a side view of a cross section of the elements illustrated in FIG. 14, in which the support flange is in the release position but is being returned to the rest position by the elastic return means.
Figure 20:
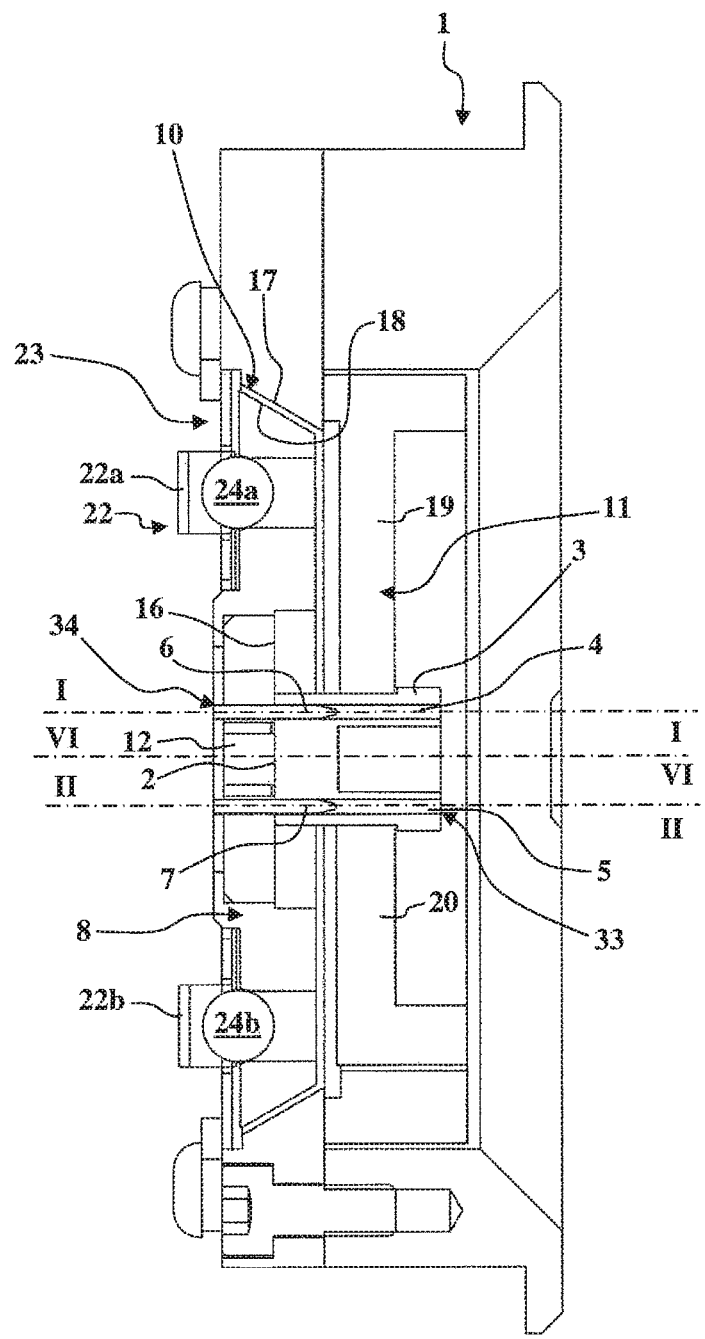
FIG. 20 is a side view of a cross section of the elements illustrated in FIG. 18, in which the support flange is in the release position and the elastic return means have been inhibited.

FIGS. 17 and 20 show that the means 10 for holding the support flange 8 are suitable for releasing the support flange 8 into at least one release position in which the support flange 8 may move with respect to the interferometry inspection device 1.

As illustrated more particularly in FIGS. 14, 16 to 18 and 20, the interferometry inspection device 1 also includes means 11 for holding the ferrule 3, which means are separate from the receiving means 34 and are selectively movable between a gripping position (FIGS. 18 and 20), in which the means 11 for holding the ferrule 3 hold the ferrule 3 fixed with respect to the interferometry inspection device 1, and a relaxed position (FIGS. 14, 16 and 17) in which the means 11 for holding the ferrule 3 allow the ferrule 3 to move with respect to the interferometry inspection device 1.

As illustrated in FIGS. 5 to 11, the support flange 8 includes:
  a light 12 passing through the support flange 8 from its first surface 8a to its second surface 8b;
  two planar reference surfaces 9a and 9b that are added and attached to the first surface 8a of the support flange 8, and positioned so as to correspond with an area of the light 12.

The light 12 is partly positioned between the two rods 6 and 7 of the receiving means 34.

More precisely, the planar reference surfaces 9a and 9b are borne by glass plates 13 and 14 that are added and attached to the first surface 8a of the support flange 8.

The first planar reference surface 9a and the second planar reference surface 9b are each positioned on one side of the plane P1 containing the first and second directions of elongation I-I and II-II of the rods 6 and 7. The reference surfaces 9a and 9b are placed on either side of the plane P1 and of the area in which the end face 2 of the ferrule 3 is located when the latter is engaged in the receiving means 34.

Figure 8:
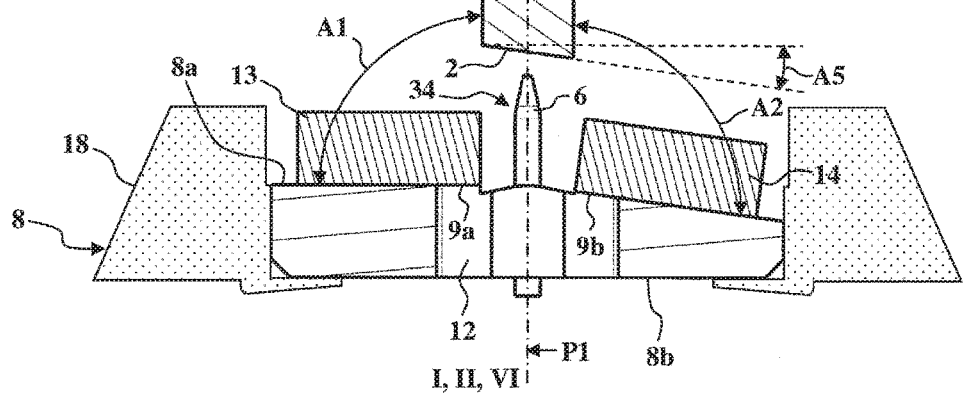
FIG. 8 is a view of a cross section, through a second plane P2 that is perpendicular to the first plane P1, of the flange of FIG. 5, before a first type of ferrule is push-fitted onto the two rods borne by the support flange.
Figure 10:
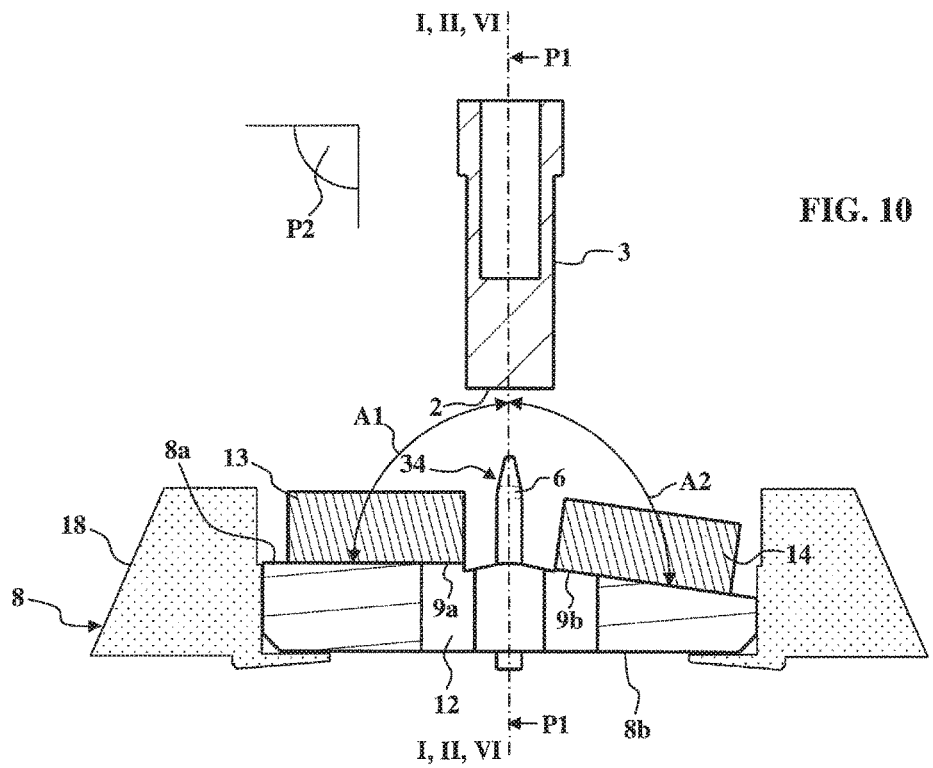
FIG. 10 is a view of a cross section, through the second plane P2 that is perpendicular to the first plane P1, of the flange of FIG. 5, before a second type of ferrule is push-fitted onto the two rods borne by the support flange.

As illustrated more particularly in FIGS. 8 and 10, the first planar reference surface 9a forms an angle A1 of about 90° with the axial receiving direction VI-VI (and hence with the first and second directions of elongation I-I and II-II of the rods 6 and 7). As regards the second reference surface 9b, it forms an angle A2 of around 98° with the axial receiving direction VI-VI.

Figure 9:
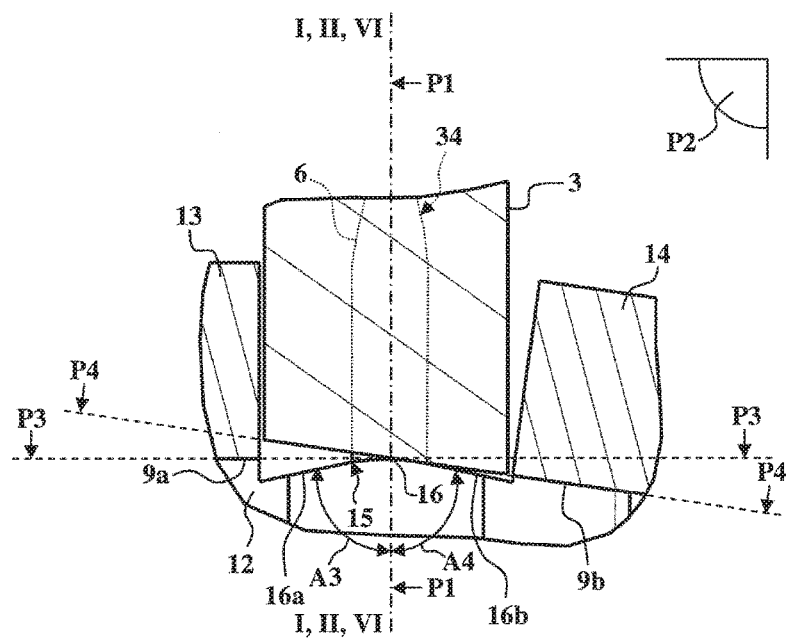
FIG. 9 is a detailed view of a cross section of the flange of FIG. 8, after the ferrule has been push-fitted onto the two rods borne by the support flange.
Figure 11:
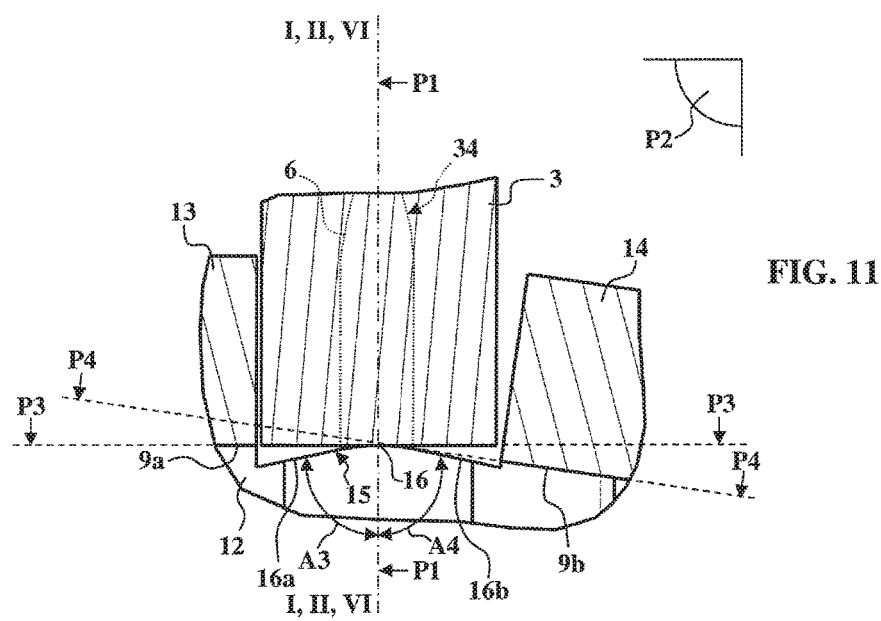
FIG. 11 is a detailed view of a cross section of the flange of FIG. 10, after the ferrule has been push-fitted onto the two rods borne by the support flange.

As illustrated in FIGS. 5, 9 and 11, a dihedron 15 protruding away from the second surface 8b of the support flange 8 is provided on the first surface 8a of the support flange 8.

The generatrix 16 at the apex of the dihedron 15 is contained in planes P3 and P4 that are defined by the planar reference surfaces 9a and 9b, respectively, as well as in the plane P1 defined by the respective directions of elongation I-I and II-II of the rods 6 and 7 (FIGS. 9 and 11).

The sides 16a and 16b of the dihedron have, with respect to the plane P1 defined by the respective first and second directions of elongation I-I and II-II of the rods 6 and 7, angles A3 and A4 that are smaller than or equal to 81°. The plane P1 also contains the axial receiving direction VI-VI.

As illustrated more particularly in FIGS. 12, 13, 16, 17 and 20, the means 10 for holding the support flange 8 include a frustoconical bearing seat 17. As regards the support flange 8, it includes a frustoconical peripheral surface 18 that is suitable for cooperating, by conical engagement, with the frustoconical bearing seat 17 of the means 10 for holding the support flange 8. In the rest position (FIG. 16), the means 10 for holding the support flange 8 keep the support flange 8 in a predetermined orientation with respect to the inspection device 1 about the axial receiving direction VI-VI. This predetermined orientation is made possible by the cooperation of the frustoconical bearing seat 17 and the frustoconical peripheral surface 18 which include complementary non-circular (oval in this instance) cross sections.

The means 11 for holding the ferrule 3 can be seen more particularly in FIGS. 14, 16 to 18 and 20. These include a first jaw 19 and a second jaw 20 that are able to move with, respect to one another. In this instance, the first jaw 19 is fixed, while the second jaw 20 is able to move with respect to the first jaw 19. In the gripping position (FIGS. 18 and 20), the jaws 19 and 20 clasp the ferrule 3 between them in order to hold it fixed with respect to the inspection device 1. In the relaxed position (FIGS. 14, 16 and 17), the jaws 19 and 20 are at a distance from one another so as to allow the ferrule 3 to move with respect, to the inspection device 1.

Figure 14:
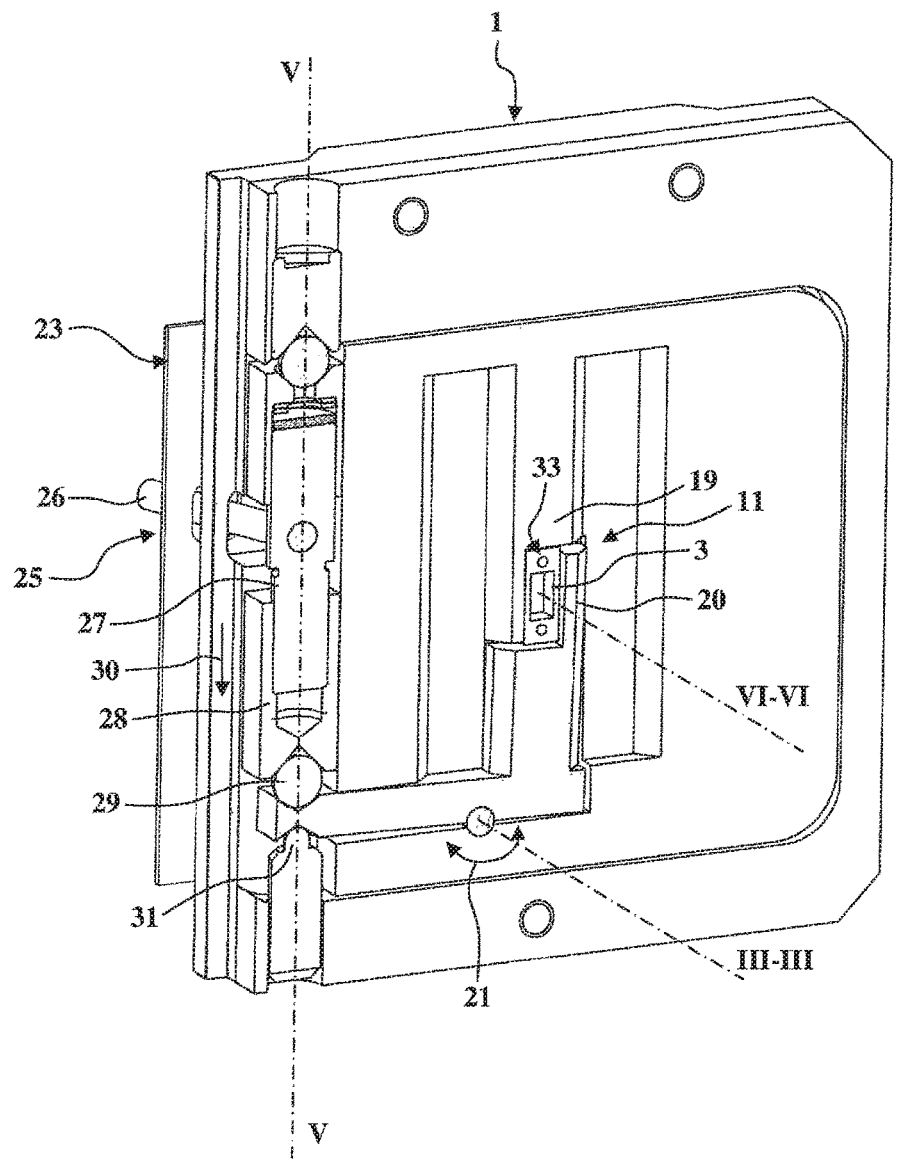
FIG. 14 is a perspective view of a partial cross section of the front face of the elements illustrated in FIG. 12, in which the means for holding the ferrule are in the relaxed position.
Figure 18:
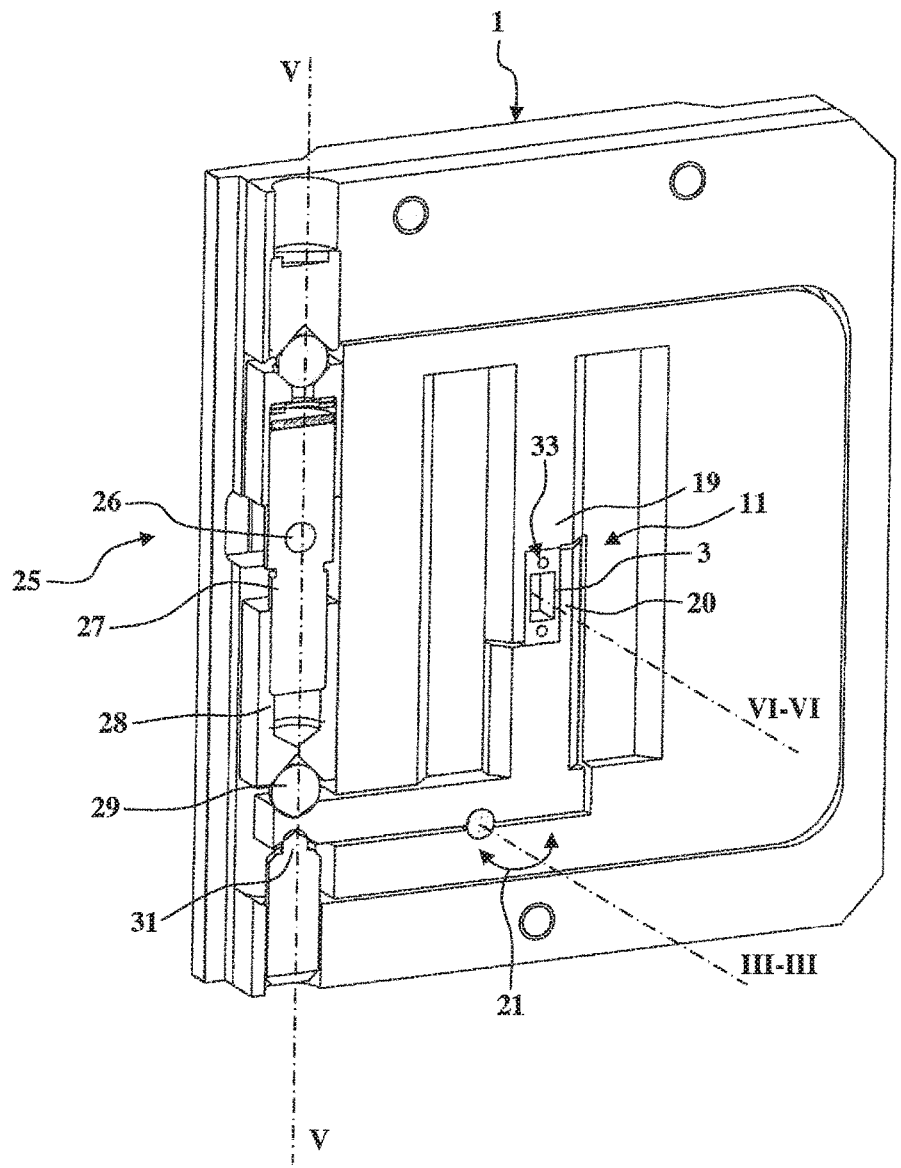
FIG. 18 is a perspective view of the front face of the elements illustrated in FIG. 14, in which the means for holding the ferrule are in the gripping position.

More precisely, the jaws 19 and 20 are each bracket-shaped, allowing them to get a good grip on the ferrule 3, the outer shape of which is substantially parallelepipedal. In order to move between the gripping and relaxed positions, the second jaw 20 is able to pivot about an axial direction III-III in a reversible movement illustrated by the double arrow 21 (FIGS. 14 and 18).

Figure 19:
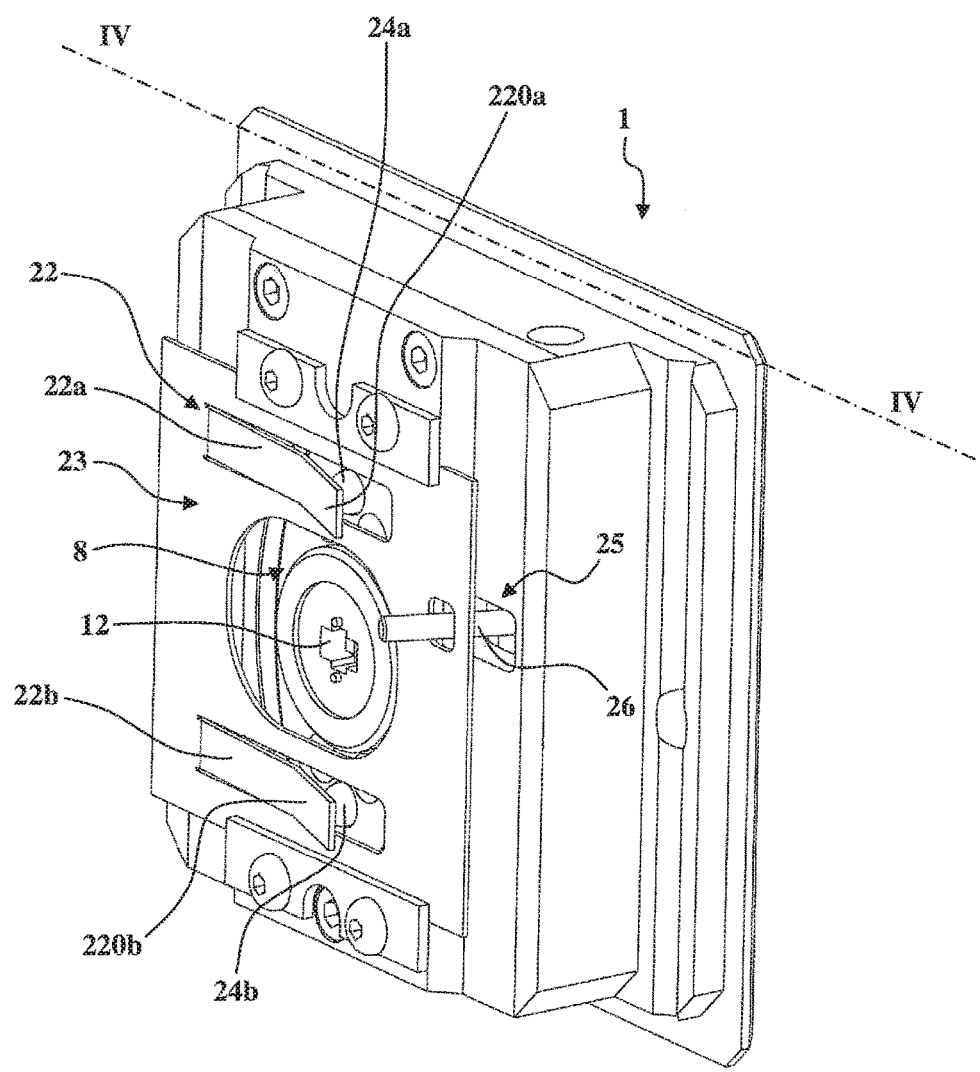
FIG. 19 is a perspective view of the rear face of the elements illustrated in FIG. 18.

FIGS. 13 and 19 more particularly show elastic return means 22 that are intended to return the support flange 8 to its rest position. In order to achieve this, the elastic return means 22 include two leaf springs 22a and 22b that are borne by a plate 23. The leaf springs 22a and 22b push the support flange 8 to its rest position by bearing on spherical bearing surfaces 24a and 24b that are borne by the support flange 8. This return to the rest position can be seen more particularly in FIGS. 16 and 17.

The free ends 220a and 220b of the leaf springs 22a and 22b are curved. As illustrated in FIG. 20, when the spherical bearing surfaces 24a and 24b are in correspondence with the curved free ends 220a and 220b (FIG. 20), the leaf springs 22a and 22b no longer make contact with the spherical bearing surfaces 24a and 24b, such that the elastic return means no longer exert any return force on the support flange 8.

Stated otherwise, the elastic return means 22 may be inhibited by inhibition means 25 including a lever 26 that is suitable for reciprocally sliding the plate 23 bearing the leaf springs 22a and 22b in a transverse direction IV-IV. In a first position of the lever 26, illustrated in FIG. 15, the plate 23 is positioned so as to correspond with the support flange 8, such that the leaf springs 22a and 22b bear against the spherical bearing surfaces 24a and 24b which exert a return force returning the support flange 8 to its rest position. In a second position of the lever 26 illustrated in FIG. 19, the plate 23 slides into a positron in which the spherical bearing surfaces 24a and 24b are in correspondence, but not in contact, with the curved free ends 220a and 220b of the leaf springs 22a and 22b. The lever 26 moving into its second position thus has the effect of inhibiting the elastic return means 22.

FIGS. 12 and 14 show that the lever 26 is rigidly connected to a threaded rod 27: the pivoting of the lever 26 between its first and second positions causes the threaded rod 27 to rotate about a transverse direction V-V. The threaded rod 27 is engaged in a threaded nut 28 which bears against the second jaw 20 via a spherical bearing surface 23.

When the lever 26 is moved to its second position (illustrated in FIG. 19) in order to inhibit the elastic return means 22, the former rotates the threaded rod 27 about the transverse direction V-V. This rotation has the effect of axially moving the threaded nut 28 in a movement illustrated by the arrow 30 (FIG. 14), thereby causing the second jaw 20 to pivot to the gripping position.

The translational movement illustrated by the arrow 30 undergone by the threaded nut 28 takes place in opposition to a pressure exerted in the opposite direction in the transverse direction V-V by an elastic pusher 31. The elastic pusher 31 thus has the effect of continually returning the second jaw 20 to its relaxed position. Thus, when the lever 26 is moved to its first position (illustrated in FIG. 15), the elastic pusher 31 automatically returns the second jaw 20 to the relaxed position.

The interferometry inspection device 1 described above makes it possible to implement a method for inspecting, by interferometry, the geometry of an end face 2 of a ferrule 3 of an optical multifiber connector, said method including the following steps:

A) providing an interferometer;

B) providing a support flange 8 including first 8a and second 8b surfaces that are substantially opposite one another and receiving means 34 that are positioned and oriented in a predetermined manner with respect to the at least one reference surface 9a, 9b borne by the support flange 8, said receiving means 34 being suitable for cooperating with the engaging means 33 of the ferrule 3 in order to position and orient the ferrule 3 with respect to the support flange 8 by receiving the ferrule 3 in an axial receiving direction VI-VI and by rotationally indexing the ferrule 3 about said axial receiving direction VI-VI;

C) providing a ferrule 3 including engaging means 33 that are suitable for cooperating with the receiving means 34, and including an end face 2, the geometry of which must be inspected;

D) engaging the ferrule 3 in the receiving means 34 of the support flange 8;

E) gripping the ferrule 3 by means of the holding means 11 in order to hold the sub-assembly formed by the ferrule 3 and the support flange 8 in a fixed position with respect to the interferometer, the support flange 8 being held, with respect to the interferometer, only via the ferrule 3 which is held in the holding means 11;

F) inspecting the geometry of the end face 2 of the ferrule 3 by focusing the interferometer on a reference surface 9a, 9b of the support flange 8 and by focusing the interferometer on the end face 2 of the ferrule 3.

It should be noted that, in the method described above, no use is made of means 10 for holding the support flange 8. The support flange 8 can in fact be held manually by a user in step D).

However, it could be preferable to use the inspection device 1 for inspecting the geometry of an end face 2 of a ferrule 3 as explained below.

Figure 1:
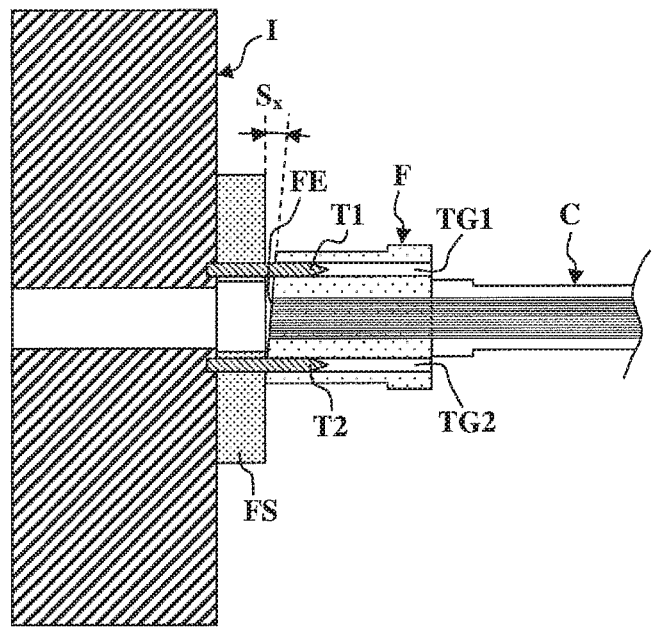
FIG. 1 is a side view of a cross section of a ferrule put in place by an operator on an interferometry inspection device according to the prior art.
Figure 2:
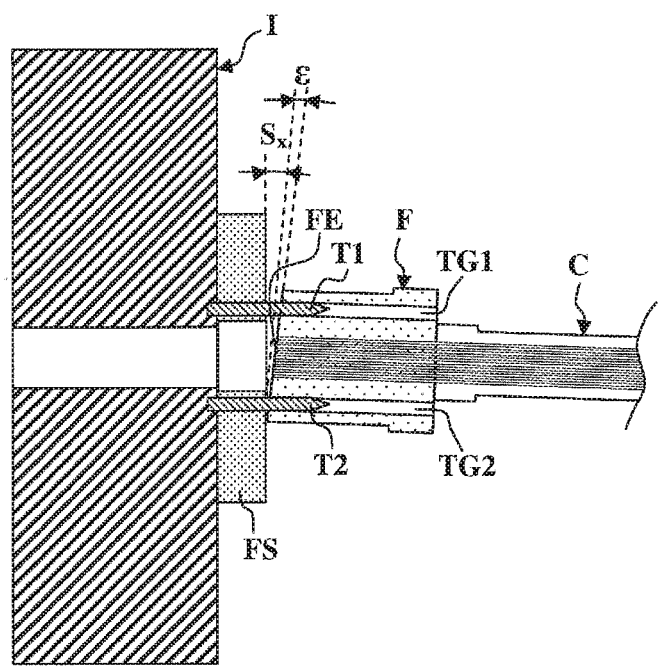
FIG. 2 is a view that is similar to that of FIG. 1 in which the operator does not provide any means for holding the ferrule and carries out the inspection of the geometry of the ferrule.
Figure 3:
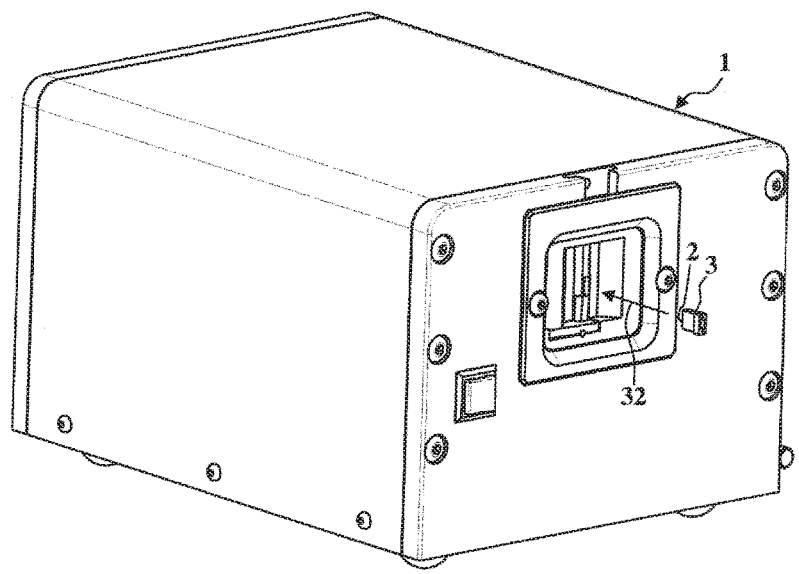
FIG. 3 is a perspective view of an interferometry inspection device according to one particular embodiment of the invention.
Figure 4:
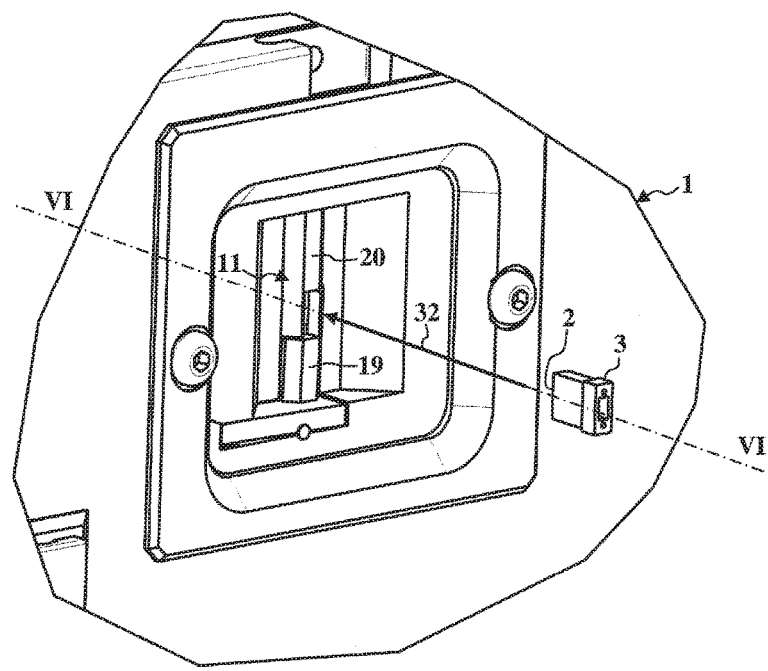
FIG. 4 is a detailed perspective view of the interferometry inspection device of FIG. 2.

In this use, an inspection device 1 according to the invention is provided, as illustrated in FIG. 3, and the user takes hold of the ferrule 3 to be inspected. The user then inserts the ferrule 3 into the inspection device 1 in a movement illustrated by the arrow 32 in the axial receiving direction VI-VI in order to engage the ferrule 3 on the rods 6 and 7 of the receiving means 34. At this moment, the jaws 19 and 20 of the holding means 10 are in the relaxed position while the support flange 8 is placed and kept in the rest position by the elastic return means 22.

Figure 16:
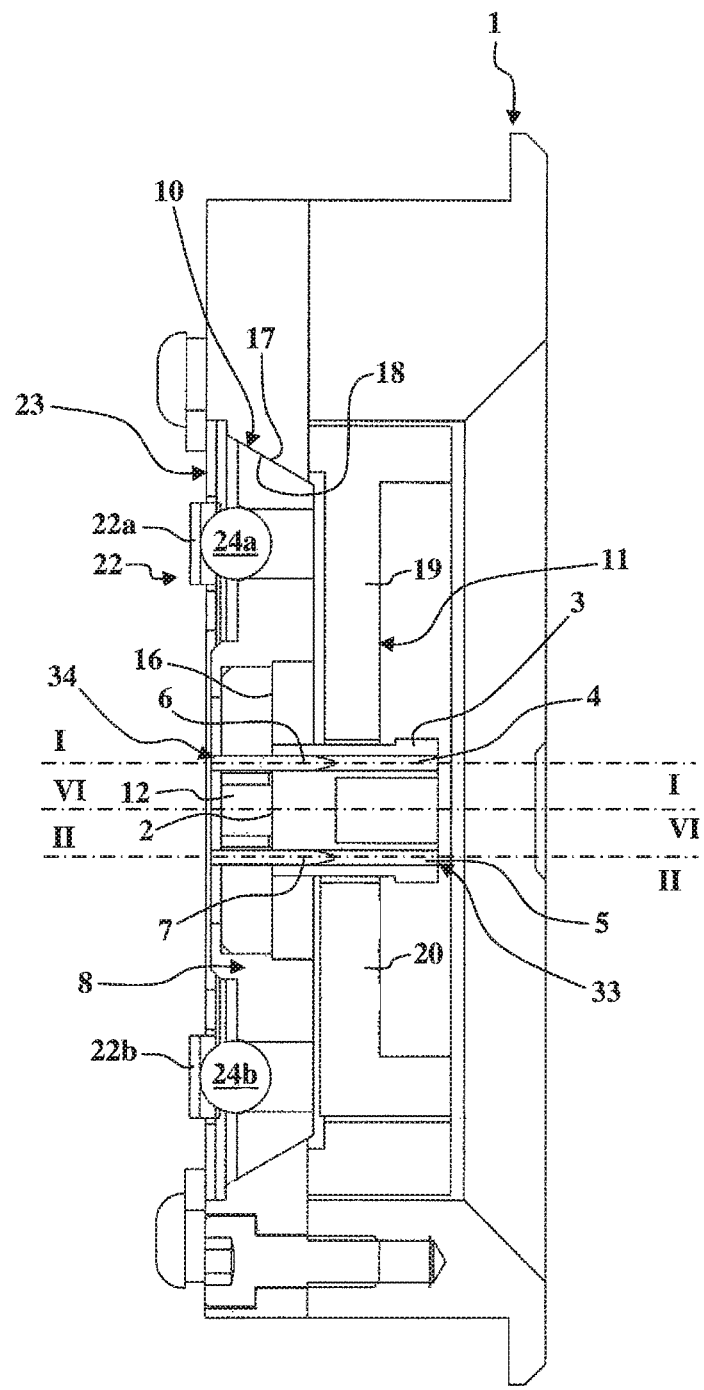
FIG. 16 is a side view of a cross section of the elements illustrated in FIG. 14, in which the support flange is in the rest position.

When it is engaged, the ferrule 3 receives the rods 6 and 7 by means of push-fitting into the guide holes 4 and 5 thereof. The rods 6 and 7 penetrate the guide holes 4 and 5 by means of gentle force until the end face 2 of the ferrule 3 bears against the generatrix 16 of the apex of the dihedron 15. It is then in the configuration as illustrated in FIG. 16. The operator then continues the movement illustrated by the arrow 32 (FIG. 4) in order to move the support flange 8 into a release position (FIG. 17) by exerting pressure in opposition to the elastic return means 22. This has the effect of disengaging the frustoconical peripheral surface 18 of the support flange 8 from the frustoconical bearing seat 17 by elastically pushing back the leaf springs 22a and 22b. Stated otherwise, the user push-fits the ferrule 3 onto the rods 6 and 7 of the flange 8 by applying pressure to the support flange 8 beyond a predetermined value making it possible to move the support flange 8 in opposition to the means 10 for holding the support flange 8 (in particular the elastic return means 22) to a release position.

The operator then moves the lever 26 to its inhibiting position (or second position) illustrated in FIG. 19. During this movement, the plate 23 slides until the leaf springs 22a and 22b no longer make contact with the spherical bearing surfaces 24a and 24b of the support flange 8.

At the same time, the movement of the lever 26 to its inhibiting position causes the second jaw 20 to pivot to its gripping position. It is then in the configuration illustrated in FIG. 20.

Once in the configuration illustrated in FIG. 20, the ferrule 3 is held by the first and second jaws 19 and 20, while the flange 8 is now held only by the cooperation of the engaging means 33 with the receiving means 34 (by push-fitting the rods 5 and 7 into the guide holes 4 and 5). Stated otherwise, the support flange 8 is held, with respect to the interferometer, only via the ferrule 3 which is held in the holding means 11: the effect of lateral stresses caused by the rigidity and/or the weight of the optical conductor is mitigated, or even cancelled out completely, by virtue of the fact that an angular movement of the ferrule 3 with respect to the interferometer is also transmitted to the support flange 8.

It is then possible to start the interferometry inspection and measurement operations.

If, as in FIG. 8, the ferrule is an APC-type ferrule (in which the end face 2 forms an angle A5 of about 8° with respect to the plane that is perpendicular to the directions of elongation of the guide holes 4 and 5), interferometry measurements are carried out on the end face 2 of the ferrule 3 and on the second reference surface 9b, which is then used as the reference surface. Comparing the measurements carried out on the end face 2 of the ferrule 3 with the measurements carried out on the reference surface 9b makes it possible to deduce the angle $S_X$ of the end face 2 with respect to the directions of elongation of the guide holes 4 and 5 of the ferrule 3 (the directions of elongation of the guide holes 4 and 5 are identical to the directions of elongation I-I and II-II of the rods 6 and 7, which directions of elongation I-I and II-II have known predetermined orientations with respect to the reference surface 9b).

If the ferrule 3 is a PC-type ferrule (in which the end face 2 is perpendicular to the directions of elongation of the guide holes 4 and 5) as in FIG. 10, it is in the configuration illustrated in FIG. 11. The inspection is then carried out by measuring multiple points on the end face 2 of the ferrule and on the reference surface 9a. The data are then processed in order to deduce the angle $S_X$ of the end face 2 of the ferrule 3 by difference with the angle of the reference surface 9a.

Regardless of whether it is an APC- or PC-type ferrule 3, the interferometry measurements are carried out on surfaces 2 and 9a or 2 and 9b that are located in one and the same plane: in FIG. 9, the end face 2 is located in the plane P4 of the reference surface 9b, while in FIG. 11, the end face 2 is located in the plane P3 of the reference surface 9a. This relative coplanarity of the surfaces to be measured makes it possible to carry out measurements more quickly by virtue of it taking less time to focus the interferometer. The accuracy of the measurements is also slightly increased.

Figure 15:
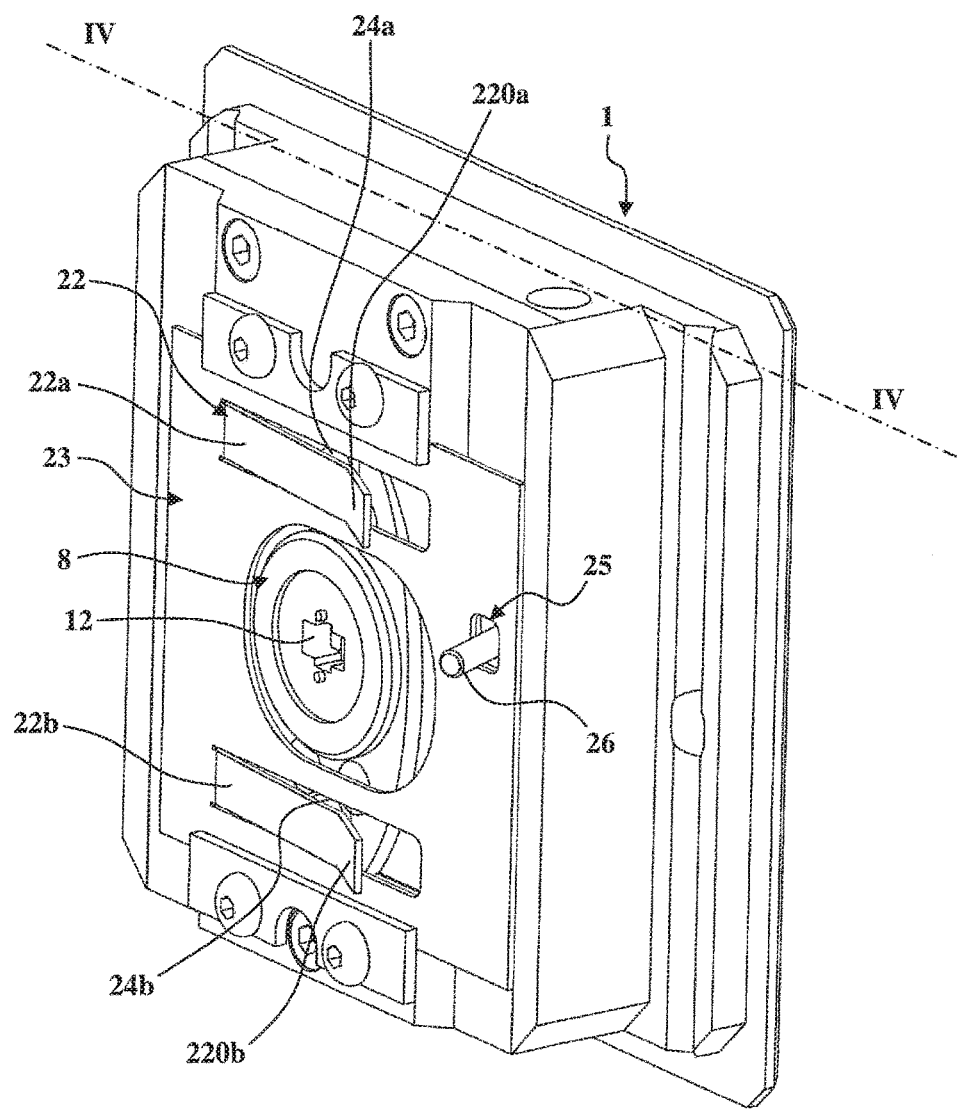
FIG. 15 is a perspective view of the rear face of the elements illustrated in FIG. 14.

Once the measurement has been carried out, the lever 26 is returned to its first position illustrated in FIG. 15. The elastic return means 22 then press the support flange 8 into the rest position, and the first and second jaws 19 and 20 are moved into the relaxed position in order to allow the user to withdraw the ferrule 3 from the rods 6 and 7 of the receiving means 34.

The inspection device 1 described above is easy for an operator to use and exhibits good repeatability and a high degree of reliability in terms of measurement. The dependence of measurement results on the dexterity of the operator is thus limited. Errors caused by the rigidity and/or the weight of the optical conductor are greatly limited since any angular movement of the ferrule 3 with respect to the interferometry inspection device 1 is also transmitted to the support flange 8.

The present invention is not restricted to the embodiments that have been explicitly described but it includes various alternative forms and generalizations thereof that fall within the scope of the claims that follow.

The invention claimed is:

1. An inspection device for inspecting, by interferometry, the geometry of an end face of a ferrule of an optical multifiber connector, said ferrule including engaging means, comprising:
   a support flange including first and second surfaces that are substantially opposite one another and receiving means that are positioned and oriented in a predetermined manner with respect to the at least one reference surface borne by the support flange, said receiving means being suitable for cooperating with the engaging means of the ferrule in order to position and to orient the ferrule with respect to the support flange by receiving the ferrule in an axial receiving direction (VI-VI) and by rotationally indexing the ferrule about said axial receiving direction (VI-VI);
   means for holding the support flange, suitable for receiving the support flange in a rest position in which the support flange is fixed with respect to the interferometry inspection device,
   wherein:
   the means for holding the support flange are suitable for releasing the support flange into at least one release position in which the support flange is able to move with respect to the interferometry inspection device;
   the interferometry inspection device includes means for holding the ferrule, which means are separate from the receiving means and are selectively movable between a gripping position, in which the means for holding the ferrule hold the ferrule fixed with respect to the interferometry inspection device, and a relaxed position, in which the means for holding the ferrule allow the ferrule to move with respect to the interferometry inspection device.

2. The inspection device as claimed in claim 1, wherein the support flange (8) includes:
   a light passing through the support flange from its first surface to its second surface;
   at least one planar reference surface that is added and attached to the first surface of the support flange, and positioned so as to correspond with an area of the light.

3. The inspection device as claimed in claim 2, wherein said at least one planar reference surface is borne by a glass plate that is added and attached to the first surface of the support flange.

4. The inspection device as claimed in claim 2, wherein:
it includes a first planar reference surface and a second planar reference surface;
the first planar reference surface forms an angle (A1) of about 90° with the axial receiving direction (VI-VI);
the second planar reference surface forms an angle (A2) of about 98° with the axial receiving direction (VI-VI).

5. The inspection device as claimed in claim 2, wherein:
it includes, on the first surface of the support flange, a dihedron protruding away from the second surface of the support flange;
the generatrix at the apex of the dihedron is contained in at least one plane (P3, P4) that is defined by said at least one reference surface.

6. The inspection device as claimed in claim 1, wherein:
it includes, on the first surface of the support flange, a dihedron protruding away from the second surface of the support flange;
the sides of the dihedron have, with respect to the axial receiving direction (VI-VI), angles (A3, A4) that are smaller than or equal to 81°.

7. The inspection device as claimed in claim 1, wherein:
the means for holding the support flange include a frustoconical bearing seat;
the support flange includes a frustoconical peripheral surface that is suitable for cooperating, by conical engagement, with the frustoconical bearing seat of the means for holding the support flange.

8. The inspection device as claimed in claim 7, wherein, in the rest position, the means for holding the support flange hold the support flange in a predetermined orientation with respect to the inspection device about the axial receiving direction (VI-VI).

9. The inspection device as claimed in claim 8, wherein:
the frustoconical bearing seat includes a non-circular cross section;
the frustoconical peripheral surface of the support flange includes a non-circular cross section that is complementary to the cross section of the frustoconical bearing seat.

10. The inspection device as claimed in claim 1, wherein:
the means for holding the ferrule include a first jaw and a second jaw that are able to move with respect to one another between a gripping position and a relaxed position;
in the gripping position, the jaws clasp the ferrule between them in order to hold it fixed with respect to the interferometry inspection device;
in the relaxed position, the jaws are at a distance from one another so as to allow the ferrule to move with respect to the interferometry inspection device.

11. The inspection device as claimed in claim 1, wherein:
the means for holding the support flange include elastic return means for returning the support flange to its rest position;
the inspection device includes inhibition means for selectively stopping the elastic return force exerted by the elastic return means.

12. The inspection device as claimed in claim 11, wherein, when a user engages a ferrule in the receiving means of the support flange by applying pressure to the support flange beyond a predetermined value, the support flange moves, in opposition to the means for holding the support flange, to a release position.

13. The inspection device as claimed in claim 1, wherein the means for holding the ferrule grip the ferrule only when the support flange is not in the rest position.

14. The inspection device as claimed in claim 1, wherein:
the receiving means include at least two rods extending in the same direction from the first surface of the support flange and away from the first surface of the support flange;
the rods extend, respectively, in first (I-I) and second (II-II) directions of elongation that are substantially parallel to predetermined orientations with respect to said at least one reference surface borne by the support flange;
the rods are dimensioned and positioned so as to be able to penetrate, respectively, the engaging means comprising guide holes, in order to position and to orient the ferrule with respect to the support flange.

15. The use of an interferometry inspection device for an inspection method comprising the following steps:
a) providing an interferometer;
b) providing a support flange including first and second surfaces that are substantially opposite one another and receiving means that are positioned and oriented in a predetermined manner with respect to the at least one reference surface borne by the support flange, said receiving means being suitable for cooperating with the engaging means of the ferrule in order to position and to orient the ferrule with respect to the support flange by receiving the ferrule in an axial receiving direction (VI-VI) and by rotationally indexing the ferrule about said axial receiving direction (VI-VI);
c) providing a ferrule including engaging means that are suitable for cooperating with the receiving means, and including an end face, the geometry of which must be inspected;
d) engaging the ferrule in the receiving means of the support flange;
e) gripping the ferrule by means of the holding means in order to hold the sub-assembly formed by the ferrule and the support flange in a fixed position with respect to the interferometer, the support flange being held, with respect to the interferometer, only via the ferrule which is held in the holding means;
f) inspecting the geometry of the end face of the ferrule by focusing the interferometer on a reference surface of the support flange and by focusing the interferometer on the end face of the ferrule,
the method further comprising:
g) providing an interferometry inspection device as claimed in claim 1;
h) providing a ferrule including engaging means that are suitable for cooperating with the receiving means, and including an end face, the geometry of which must be inspected;
i) placing the support flange in the rest position;
j) engaging the ferrule in the receiving means of the support flange;
k) placing the support flange in the release position;
l) moving the means for holding the ferrule into the gripping position;
m) inspecting the geometry of the end face of the ferrule by focusing the interferometer on a reference surface of the support flange and by focusing the interferometer on the end face of the ferrule.

16. The use as claimed in claim 15, wherein:
the interferometry inspection device includes elastic return means for returning the support flange to its rest position;

the interferometry inspection device includes inhibition means for selectively stopping the elastic return force exerted by the elastic return means;

in step j), the user applies a force that causes the support flange to move to a release position in opposition to the elastic return means;

after step l), the inhibition means stop the return of the support flange to its rest position exerted by the elastic return means.

17. The use as claimed in claim 15, wherein, in step m), the interferometer is simultaneously focused on the end face of the ferrule and on a reference surface.

18. A method for inspecting, by interferometry, the geometry of an end face of a ferrule of an optical multifiber connector, including the following steps:

a) providing an interferometer;

b) providing a support flange including first and second surfaces that are substantially opposite one another and receiving means that are positioned and oriented in a predetermined manner with respect to the at least one reference surface borne by the support flange, said receiving means being suitable for cooperating with the engaging means of the ferrule in order to position and to orient the ferrule with respect to the support flange by receiving the ferrule in an axial receiving direction (VI-VI) and by rotationally indexing the ferrule about said axial receiving direction (VI-VI);

c) providing a ferrule including engaging means that are suitable for cooperating with the receiving means, and including an end face, the geometry of which must be inspected;

d) engaging the ferrule in the receiving means of the support flange;

e) gripping the ferrule by means of the holding means in order to hold the sub-assembly formed by the ferrule and the support flange in a fixed position with respect to the interferometer, the support flange being held, with respect to the interferometer, only via the ferrule which is held in the holding means;

f) inspecting the geometry of the end face of the ferrule by focusing the interferometer on a reference surface of the support flange and by focusing the interferometer on the end face of the ferrule.

19. The inspection method as claimed in claim 18, wherein, in step f), the interferometer is simultaneously focused on the end face of the ferrule and on a reference surface.

* * * * *